United States Patent
Liberman et al.

(10) Patent No.: US 10,488,615 B2
(45) Date of Patent: Nov. 26, 2019

(54) FIBEROPTIC LOOSE TUBE MANUFACTURE AND POST EXTRUSION SHRINKAGE

(71) Applicant: Teldor Cables & Systems Ltd., Kibbutz Ein Dor (IL)

(72) Inventors: Tuvia Liberman, Kfar-Tavor (IL); David Miller, Carmiel (IL)

(73) Assignee: Teldor Cables & Systems Ltd., Kibbutz Ein Dor (IL)

( * ) Notice: Subject to any disclaimer, the term of this patent is extended or adjusted under 35 U.S.C. 154(b) by 206 days.

(21) Appl. No.: 15/696,323

(22) Filed: Sep. 6, 2017

(65) Prior Publication Data

US 2019/0072739 A1    Mar. 7, 2019

(51) Int. Cl.
| | |
|---|---|
| *B29C 48/00* | (2019.01) |
| *G02B 6/44* | (2006.01) |
| *B29C 48/154* | (2019.01) |
| *B29K 23/00* | (2006.01) |
| *B29K 67/00* | (2006.01) |

(52) U.S. Cl.
CPC ........ *G02B 6/4486* (2013.01); *B29C 48/0011* (2019.02); *B29C 48/154* (2019.02); *G02B 6/4433* (2013.01); *G02B 6/4484* (2013.01); *B29K 2023/12* (2013.01); *B29K 2067/006* (2013.01)

(58) Field of Classification Search
CPC ................... G02B 6/4484; B29C 2045/14557
USPC ....................................... 264/1.29, 1.28, 2.7
See application file for complete search history.

(56) References Cited

U.S. PATENT DOCUMENTS

| | | |
|---|---|---|
| 6,324,324 B1 | 11/2001 | Dixon et al. |
| 6,801,695 B2 | 10/2004 | Lanier et al. |
| 7,346,244 B2 | 3/2008 | Gowan et al. |
| 7,379,642 B2 | 5/2008 | Kachmar |
| 8,798,416 B2 | 8/2014 | Kachmar |
| 9,223,102 B1 | 12/2015 | Parris et al. |
| 2002/0096793 A1 | 7/2002 | Marelli |

(Continued)

FOREIGN PATENT DOCUMENTS

| | | |
|---|---|---|
| GB | 1576339 | 10/1980 |
| GB | 2134842 | 8/1984 |

OTHER PUBLICATIONS

European Search Report and the European Search Opinion dated Jan. 31, 2019 From the European Patent Office Re. Application No. 18193074.4. (8 Pages).

*Primary Examiner* — Christina A Johnson
*Assistant Examiner* — Xue H Liu (57) ABSTRACT

Elastic compression apparatus for loose tube used in fiber optic cables, comprising compression contacts for gripping the loose tube following extrusion, the loose tube being made of a first material having a predefined post-extrusion shrinkage, and the compression contacts being made of a second material, wherein the compression contacts are modified to provide a coefficient of friction between the two materials such that said compression contacts apply a radial pressure and an axial tension to said tube that cause elastic deformation only and do not cause plastic deformation. The tube may be extruded at a line speed rate that is relatively different from the optical fiber line speed rate, and causes elastic extension of the tube over the distance that would be covered by post-extrusion shrinkage.

7 Claims, 3 Drawing Sheets

(56) References Cited

U.S. PATENT DOCUMENTS

2010/0043953 A1* 2/2010 Riddett ............. C03B 37/02736
156/167
2012/0189255 A1* 7/2012 Casals .................. G02B 6/4484
385/100

* cited by examiner

FIBEROPTIC LOOSE TUBE MANUFACTURE AND POST EXTRUSION SHRINKAGE

FIELD AND BACKGROUND OF THE INVENTION

The present invention, in some embodiments thereof, relates to manufacture of loose tubes for fiberoptic cables, post extrusion shrinkage, and more particularly but not exclusively, to a way of mitigating or overcoming the effects of post extrusion shrinkage (PES) in loose tube fiber optic cables.

Loose tube fiber optic cables are commonly employed in long-haul, metro-core, access, distribution, indoor or outdoor, premises and even in submarine applications. One parameter of the loose tube design is excess fiber length. Excess fiber length can be defined as the additional physical fiber length as compared to the linear physical length of the loose tube in which the fibers are contained.

Excess fiber length in a loose tube is a parameter primarily to be controlled during loose tube manufacturing, commonly through the use of an interim capstan, and if executed, also during the stranding of said loose tubes. If excess fiber length is above a certain threshold, it will harm the optical performance of the cable. Likewise, if the excess fiber length is too low.

Loose tubes are considered for multi-loose tube cables, although the issue applies mutatis mutandis to Central tube (Mono-tube or Uni-tube) cables. Multi-loose tube cables are stranded around a central strength member. Color coded loose tubes are fed to a stranding unit. Feeding is via dancer and pulley units. Controlled tension is applied on the loose tubes to keep them taut while stranding, and may cause elongation of the loose tubes. The effect of tension i.e., elongation or strain on loose tube can be calculated using the following formula:

$$\text{Elongation in \%} = T/Y \times A \times 100$$

where T is the tension applied in kg, Y is the Young's modulus of loose tube plastic material in kg/mm$^2$ and A is the cross sectional area of loose tube in mm$^2$.

A typical tension to be applied to the loose tube is generally around 250 grams. This value is required to be changed slightly based on the actual condition of the loose tube. If the tubes show looseness, the tension may be increased, provided we are confident that the excess fiber length in the tubes can withstand the new load, and the above formula may be used. The strain due to the tension should be equal to or less than the excess fiber length. In other words the excess fiber length in the loose tubes should nullify the effect of strain on the fiber induced due to elongation of tubes at stranding.

Fiber excess length present in the loose tube which is used in multi-loose tube fiber optic cables takes into account tube elongation caused during the stranding process as well as during cable installation.

Thus, in multi-loose tube cables, affecting excess fiber length may be achieved through the stranding process in addition to that achieved during the process of producing the loose tube itself. There is no stranding in central tube cables nor is there a central strength member around which multiple tubes are stranded. Hence, during central tube cable manufacturing the process often is required to provide more excess fiber length compared to that of the loose tube for stranded multi-loose tube cables.

The issue of post extrusion shrinkage is discussed in U.S. patent application Ser. No. 11/039,122 to Wayne Kachmar.

A fiber optic cable typically includes: a fiber or fibers; a buffer or buffers that surrounds the fiber or fibers; a strength layer that surrounds the buffer or buffers; and an outer jacket. Optical fibers function to carry optical signals. A typical optical fiber includes an inner core surrounded by a cladding that is covered by a dual layer coating. Buffers typically function to surround and protect coated optical fibers. Strength layers add mechanical strength to fiber optic cables to protect the internal optical fibers against stresses applied to the cables during installation and thereafter. Examples of strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids) and environmental effects (UV rays from sunlight etc.).

It is well known that macro-bending of an optical fiber within a cable will negatively affect optical performance. Shrinkage of the outer jacket of a fiber optic cable can cause axial stress to be applied to the optical fiber, which causes a cyclical/periodic macro-bending of the optical fiber. One cause of jacket shrinkage is thermal contraction caused by decreases in temperature and crystallization of the molecular structure of the polymeric extrudate. Another source of shrinkage is post-extrusion shrinkage.

Shrinkage caused by thermal contraction is typically only temporary or elastic in nature. The amount of thermal expansion/contraction is dependent upon the coefficients of thermal expansion of the materials involved. In a typical fiber optic cable, the jacket has a higher coefficient of thermal expansion than the fiber. Thus, when the temperature drops due to normal environmental temperature cycling, the jacket may shrink more than the fiber causing stresses to be applied to the fiber. These stresses are typically only temporary or elastic, since the jacket will expand back to its original size when the temperature returns to ambient.

Post-extrusion shrinkage is a by-product of the extrusion process used to manufacture fiber optic cables. Generally, to make a fiber optic cable, an optical fiber is passed through an extrusion die and molten plastic material is extruded about the exterior of the fiber. As the molten plastic exits the extrusion die, it is elongated in the direction of flow and then passed through cooling baths where the elongated shape of the plastic is set. However, after the shape has been set, the plastic material continues to have "memory" of the pre-elongated shape.

Thus, if the cable is later heated, the plastic material will gravitate towards its pre-elongated shape thereby causing post-extrusion axial shrinkage of the cable jacket. As indicated above, cable jacket shrinkage can cause macro-bending of the optical fiber thereby degrading signal quality. Unlike shrinkage caused by thermal contraction, post-extrusion shrinkage of the type described above is permanent or plastic in nature.

Post-extrusion shrinkage is a significant problem in the area of optical fiber connectorizing. When a connector is mounted to the end of a fiber optic cable, a heat cure epoxy is often used to secure the connector to the jacket and strength layer. When the epoxy is heated during the cure cycle, the cable jacket is also heated thereby causing permanent post-extrusion shrinkage. Post-extrusion shrinkage can also be caused after installation by environmental temperature variations, or even after a cable is released from the winding tensions on the shipping drum, enabling the cable jacket to contract.

In general, excess fiber length is designed to be within the elastic deformation region of the cable and the cable can shrink or elongate to cover the excess length, with the amount of shrinkage or elongation varying depending on environmental temperature and cycling during the course of the life of the cable as well as additional axial tensions present. Post extrusion shrinkage however tends to be in the plastic deformation region and is permanent.

The existing art deals with post extrusion shrinkage through material constriction. In addition, the existing art deals with excess fiber length as part of the manufacturing process. The two different effects are of different orders of magnitude and occur at different timescales.

Additional background art includes U.S. Pat. Nos. 7,379, 642 6,801,695 7,346,244 6,324,324 8,798,416

SUMMARY OF THE INVENTION

The present embodiments may adapt some current in-line production equipment that deals with excess fiber length for the purpose of reducing or eliminating post extrusion shrinkage. That is to say, the plastic tube is elongated under specific conditions during extrusion so that the shape memory of the pre-extrusion shape is lost. The fiber and the plastic tubing around the fiber proceed at different line speeds along the extrusion line, and the friction between the compression wheels or belts and the tubing is carefully controlled to provide an axial tension and radial pressure that carefully controls the extrudate line speed. The idea is not to cause any plastic deformation so as to leave no shape memory and thus avoid instances of subsequent post extrusion shrinkage that might have occurred during temperature changes in use.

According to an aspect of some embodiments of the present invention there is provided a loose tube elastic compression apparatus for central loose tube fiber optic cables, comprising:

contacts for the compression of the loose tube following extrusion;

a further point of physical contact at a predetermined distance from the compression contacts;

the loose tube being made of a first material having a predefined post-extrusion shrinkage, and the compression contacts being made of a second material, wherein the compression contacts are modified to provide a coefficient of friction between the first material and the second material such that the compression contacts apply a radial pressure that only causes elastic deformation, and the compression contacts further impart an axial tension to the tube at a predetermined line speed of the tube, the line speed, axial tension and radial pressure being in a combination to cause harmonic vibration of the loose tube over the distance, thereby to mitigate post-extrusion shrinkage.

In an embodiment, the modifying comprises coating the compression contacts with a coating of friction increasing material.

In an embodiment, the coating relatively increases the line-speed rate.

In an embodiment, the compression contacts are wheels.

In an embodiment, the compression contacts are caterpillar belts.

According to a second aspect of the present invention there is provided a method of compensating for post extrusion shrinkage of a central loose tube optical fiber cable consisting of a first material being extruded over an optical fiber or fibers, peripheral strength members, and an outer polymeric jacket, the method comprising:

estimating the post extrusion shrinkage of the first material;

estimating a tube elongation relative to fiber length required to compensate for the shrinkage;

estimating a production line speed for the first material to compensate for the shrinkage;

estimating a coefficient of friction to provide the estimated line speed;

modifying compression contacts to provide the estimated coefficient of friction; and achieving visible harmonic vibration (standing wave) of the loose tube between compression contacts and a next point of physical contact with the loose tube.

The method may comprise determining a radial pressure and an axial tension to cause elastic deformation of the tube without causing plastic deformation of the tube.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to post-extrusion shrinkage and, more particularly, but not exclusively, to a way of manufacturing a central loose tube cable without any plastic deformation so that post extrusion shrinkage is mitigated or does not occur in any substantial way.

Post extrusion shrinkage may be reduced or even eliminated by suitable control of the compression wheels or caterpillar belts during the loose tube extrusion process and by controlling the level of dynamic friction between the compression wheels or caterpillar belts and the material being extruded at the same time. Control of the dynamic friction allows for control of the radial pressure and axial tension exerted by the compression wheels or caterpillar on the tube so that all deformation is elastic and the tube is not deformed plastically either by being gripped too tightly or by being pulled too hard.

For any given material at a certain temperature, a typical percentage of post-extrusion shrinkage is to be expected and may be obtained from a table. The compression wheels may be coated with a given material to give a particular level of dynamic friction between the compression wheels and the material being extruded and once the friction is known then the wheels can be controlled to provide a radial pressure that holds material tightly enough to induce axial tension that stretches the material elastically only so as to mitigate any significant post extrusion shrinkage.

Thus an extrusion line for a loose tube to be used in fiber optic cables comprises compression contacts for elastic compression of the loose tube during extrusion, the loose tube being made of a first material having a pre-defined post-extrusion shrinkage, and the compression contacts being made of a second material, wherein the compression contacts are modified to provide a coefficient of friction between the two materials such that the compression contacts apply a radial pressure and an axial tension to the tube that cause elastic deformation only and do not cause plastic deformation. The tube may be compressed to proceed at a rate that is different from the optical fiber line speed, and causes elastic extension of the tube over the distance that would be covered by post-extrusion shrinkage.

Typical requirements for excess fiber length are 0.02%. Tolerance for post extrusion shrinkage is between 0 and 0.4%.

To avoid post extrusion shrinkage a certain maximum grip or traction of the material is provided. The grip is a product of the radial pressure provided by the compression wheels or belts and the dynamic friction between the compression wheels or belts and the material being extruded. The grip should be such that the material is not plastically deformed.

The relative length after extrusion may be the length that the tube is required to be to provide the necessary excess fiber length.

The tubes may typically be made from PBT (polybutylene terephthalate), Nylon 12, or Polypropylene, each with its typical coefficient of dynamic friction.

The cable outer jacket material may include PVC, polyethylene, or polyurethane, and each material may have cross-linked varieties. Halogen free flame retardant additives (HFFR) may also be used and these need to be taken into account as regards the PES for the cable as a whole.

The cable may be non-armoured or armoured, often with corrugated steel, aramid (aromatic polyamide) strength yarns, fiber reinforced plastic etc.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
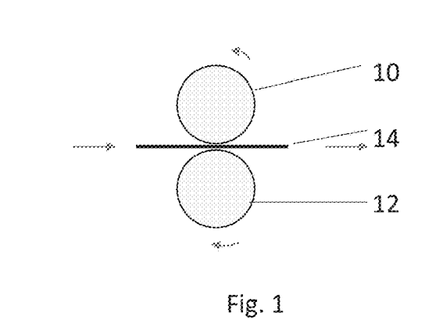
FIG. 1 is a simplified diagram showing a loose tube being pulled through compression wheels according to an embodiment of the present invention.

Referring now to the drawings, FIG. 1 illustrates part of an elastic compression apparatus in which compression wheels 10 and 12 rotate to clench or grip a loose tube 14 that is formed around an optical fiber or fibers.

The material surrounding the optical fiber and entering the elastic compression apparatus is a semi-molten extrudate that is starting to harden and cool down. The extrudate may form a loose-tube containing bare color-coded, say 250 micron diameter, optical fibers and usually some thixotropic gel. Functionally the compression wheels impart both radial pressure and axial tension through physical contact with the extrudate, and the pressure and tension result in a controlled variation of line-speed between the loose-tube material and the contents, namely the fibers. The physical contact thus contributes to the overall extrusion of the tube itself without causing permanent deformation to the tube's shape or dimensions or to the fibers contained within.

The dual wheel construction consists of two vertically parallel pulley wheels 10 and 12, and in embodiments, the areas of contact with the loose tube may have a coating of material whose coefficient of friction with the loose tube material is selected. The area of contact may be a coated flat surface or there may be a guiding groove that the tube enters.

Figure 2:
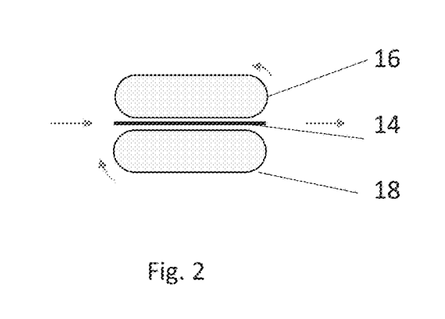
FIG. 2 is a simplified diagram showing a loose tube being pulled through compression caterpillar belts according to an embodiment of the present invention.

Reference is now made to FIG. 2, which illustrates a variation of the embodiment of FIG. 1 in which rotating wheels are replaced by caterpillar belts 16 and 18 that form an elongated region of contact with the tube 14. The caterpillar version consists of two horizontally parallel belts have a coating of material whose coefficient of friction with the tube material may be selected to achieve both the excess fiber length and to compensate for post extrusion shrinkage.

The radial pressure imparted may be such as to achieve a required level of traction on the loose tube material that does not cause plastic deformation of the polymer or adversely affect the lay of the fibers inside the tube. Such a condition may define a precise range whose numbers depend on material (Melt Flow Index, Tension and Elongation) and wall thickness. The axial tension imparted may be selected such that the precisely controlled difference between the line speed of the loose tube material and the line speed of the optical fibers within again causes only elastic deformation and not plastic deformation, thus generating the required mitigating post-extrusion shrinkage phenomenon.

In order to achieve the required phenomena to functionally eliminate PES, the radial pressure and axial tension may create the two different line speeds as described above, the one for the fiber and the other for the tube. Too much friction on the other hand pulls too hard and may deform the tube material. Too little friction and there will be no or little traction.

A visual indication of achieving the above is the formation of a standing wave, a harmonic vibration or cyclic galloping of the loose tube, between the elastic compression apparatus and the next point of physical contact with the loose tube, often the interim capstan. Thus the friction or gripping level and the line speed may be adjusted, typically by trial and error for a given material, until a standing wave is obtained. Once the standing wave is obtained, the current parameters may be recorded for the given material and reused as necessary.

Figure 5:
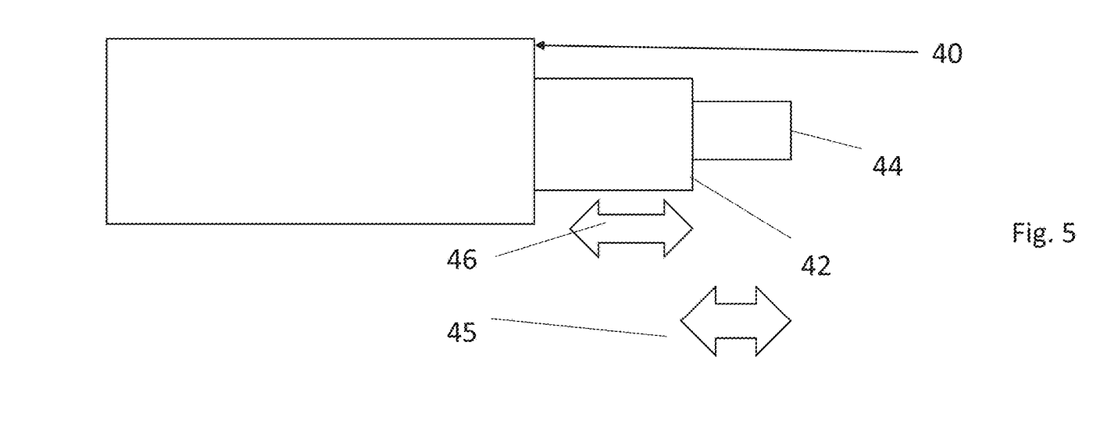
FIG. 5 is a side view of a Central loose tube cable showing the directions and locations of post-extrusion shrinkage.

Reference is now made to FIG. 5, which illustrates a side view of one end of a central loose tube cable 40 where loose tube 42 surrounds an inner optical fiber bundle 44. The shrinkage of the various polymers after extrusion at or near their Tg/extrusion temperatures is well documented, and is normally expressed as a percentage of the initial length. For example if it is known that a given material shrinks linearly (PES)×% then one needs to compress the tube precisely to ensure that the post extrusion shrinkage and consequent plastic deformation does not occur. One may therefore compute the amount of elastic compression needed to impart on the tube extrudate during the tube extrusion process.

The PES, had it been allowed to occur, would have reduced the tube by length of arrow 46. The length 45 is the pistoning of the fiber bundle beyond the length of the tube if the shrinkage occurs. Excess fiber length is manifested as slightly curving within the length of the cable.

The coefficients of dynamic friction are selected for the physical meeting between two materials, the two materials being the wheel or belt coating material and the polymer used in the tube. The skilled person may make a match between the material coating, the compression wheels or belts and the tube material.

Figure 3:
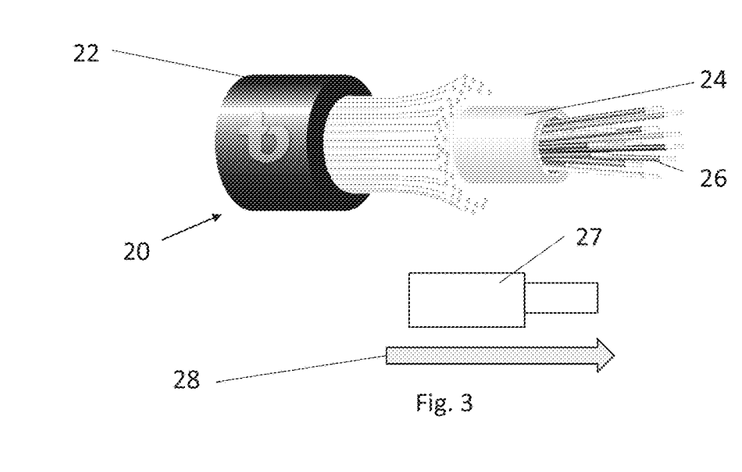
FIG. 3 is a side view of a loose tube cable showing an axial tension direction according to embodiments of the present invention.
Figure 4:
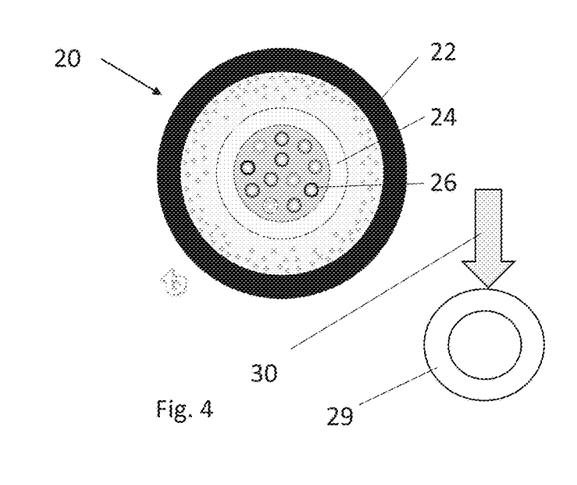
FIG. 4 is a cross-section of a loose tube cable showing a radial pressure direction according to embodiments of the present invention.

Reference is now made to FIGS. 3 and 4 which are side and cross-sectional views of a typical Central loose tube cable 20 having an outer jacket 22, an inner tube 24, and optical fibers 26 surrounded by colored dual layer coatings. The cables are made by extrusion of the loose tube over the optical fibers as discussed above, addition of peripheral strength members and an outer polymeric jacket.

The loose tube parts of the cable are shown as inserts 27 and 29. Axial tension is in the direction of arrow 28 and radial pressure is in the direction of arrow 30 (note that tension is on the tube and not on the cable).

Figure 6:
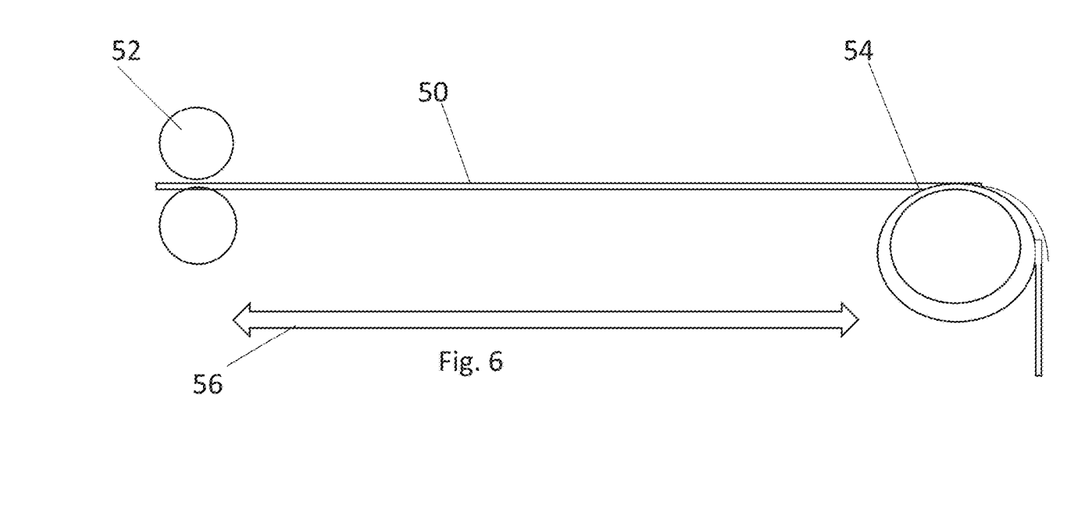
FIG. 6 is a simplified side view of a loose tube after extrusion passing through a compression stage and continuing to a next point of contact here shown as an interim capstan, according to embodiments of the present invention.

Reference is now made to FIG. 6, which shows tube 50 between compression wheels 52 and an interim capstan 54 after being extruded over the optical fibers. The interim capstan 54 serves as the next point of physical contact after the elastic compression apparatus and thus defines a distance 56 for a harmonic vibration to occur.

When the above two effects, namely the axial tension and radial pressure are achieved, a harmonic cyclical vibration may occur along the tube over the length indicated by arrow 56, between the elastic compression apparatus 52 and the next point of contact down the production line, and when the elastic compression apparatus and the line speed are correctly set then what is in effect a standing wave may be created in the advancing tube. The creation of a harmonic is an indication that the desired parameters have been obtained. As discussed elsewhere herein, the harmonic vibration is achieved by trial and error in adjusting the parameters of the elastic compression apparatus and specifically by making small changes to the grip or traction and to the line speed. Once a standing wave is set up the current parameters may be retained for the specific combination of size and materials of the loose tube being manufactured.

Figure 7:
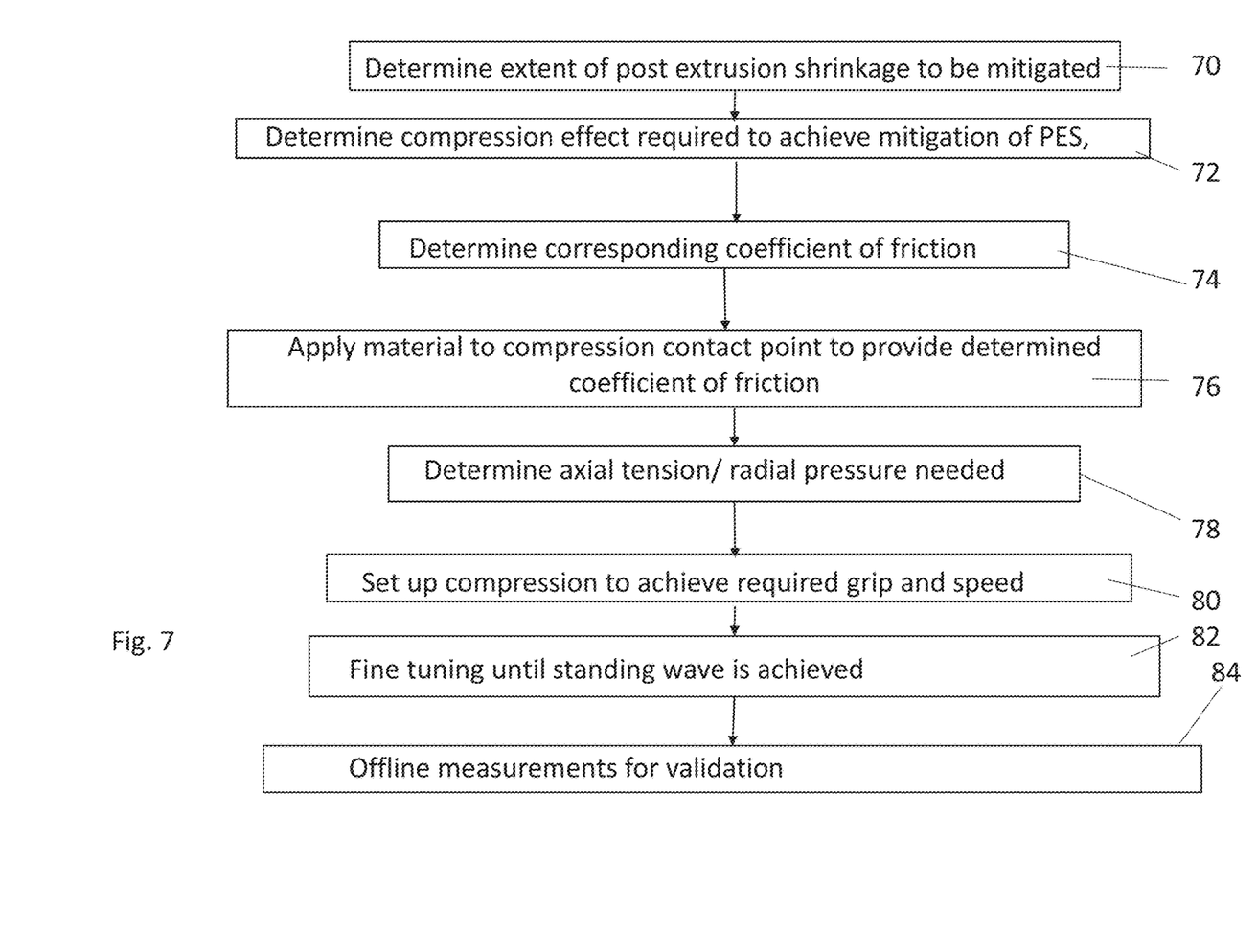
FIG. 7 is a simplified flow chart showing a procedure for mitigating the effects of PES according to embodiments of the present invention.

A combination of axial tension, radial pressure and the standing wave between successive points of physical contact may enable the functional mitigation of post-extrusion shrinkage in a Central loose tube cable design. Reference is now made to FIG. 7, which schematically illustrates a procedure for modifying an existing loose tube extrusion line to compensate for post extrusion shrinkage according to embodiments of the present invention.

The expected extent of post-extrusion shrinkage is obtained as a percentage from the tube material properties 70.

The compression effort or grip to achieve mitigation of the expected extent is then calculated 72 and a corresponding coefficient of friction is determined—74.

In 76 a material is added as necessary to the compression wheels or caterpillar belts as needed to achieve the required coefficient of friction for the given tube material and wheel contact surface coating material.

In 78 the required axial tension and radial pressure are determined.

A line speed and radial pressure combination is now determined for the tube—78. It is noted that the line speed of the tube is relatively different from the speed of the optical fibers, and allows for elastic deformation only, to an extent to cover the expected post extrusion shrinkage.

The elastic compression apparatus is then set up to provide the calculated values of friction and radial pressure and to operate with the required axial tension—80.

The axial tensions and radial pressures as calculated are then fine-tuned 82 to achieve a standing wave of the tube between the compression wheel or belts and the next point of contact. The standing wave serves an indication that the conditions have been achieved to elastically deform the tube, but not to press enough to affect the fibers within and not to cause any plastic deformation of the tube—74

Finally offline measurements may be made of the resulting loose tube to validate the mitigation of PES in practice, and the values as obtained may be used to carry out the steady-state manufacturing process.

It is expected that during the life of a patent maturing from this application many relevant extrusion and elastic compression technologies will be developed and the scopes of these and other corresponding terms are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral)

within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

In the following, three different outer diameters on two different materials were used for the loose tube (LT) production.

| LT Material | LT nominal o.d. | Coef. Of Linear Therm. Exp. | Tensile modulus | Modulus of elasticity | Torque on Interim Capstan with 0% slippage of LT in elastic compression device at max. speed | Typical/ Maximum Line speed when achieving standing wave |
|---|---|---|---|---|---|---|
| PBT | 3.1 mm | 14-15 μm/m-° C. | 2,600 MPa | 2.4 GPa | 35 N · m | 300/400 m/min |
| PP | 2.5 mm | 12-13 μm/m-° C. | 1,035 MPa | 1.3 GPa | 70 N · m | 450/600 m/min |
| PBT | 2.1 mm | 14-15 μm/m-° C. | 2,600 MPa | 2.4 GPa | 50 N · m | 400/500 m/min |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Loose tube elastic compression apparatus for central loose tube fiber optic cables, comprising:
    contacts for the compression of the loose tube following extrusion;
    a further point of physical contact at a predetermined distance from said compression contacts;
    the loose tube being made of a first material having a predefined post-extrusion shrinkage, and the compression contacts being made of a second material, wherein the compression contacts are modified to provide a coefficient of friction between said first material and said second material such that said compression contacts apply a radial pressure that only causes elastic deformation, and said compression contacts further impart an axial tension to said tube at a predetermined line speed of said tube, the apparatus configured to set the line speed, axial tension and radial pressure into a combination to cause harmonic vibration of said loose tube over said distance, thereby to mitigate post-extrusion shrinkage.

2. The loose tube elastic compression apparatus of claim 1, wherein said modifying comprises coating said compression contacts with a coating of friction increasing material.

3. The Loose tube elastic compression apparatus of claim 2, wherein said coating relatively increases said line-speed rate.

4. The Loose tube elastic compression apparatus of claim 1, wherein said compression contacts are wheels.

5. The Loose tube elastic compression apparatus of claim 1, wherein said compression contacts are caterpillar belts.

6. A method of compensating for post extrusion shrinkage of a central loose tube optical fiber cable consisting of a first material being extruded over an optical fiber or fibers, peripheral strength members, and an outer polymeric jacket, the method comprising:
    estimating said post extrusion shrinkage of said first material;
    estimating a tube elongation relative to fiber length required to compensate for said shrinkage;
    estimating a production line speed for said first material to compensate for said shrinkage;
    estimating a coefficient of friction to provide said estimated line speed;
    modifying compression contacts to provide said estimated coefficient of friction;

and achieving visible harmonic vibration (standing wave) of said loose tube between compression contacts and a next point of physical contact with said loose tube.

7. The method of claim 6, comprising determining a radial pressure and an axial tension to cause elastic deformation of said tube without causing plastic deformation of said tube.

\* \* \* \* \*